United States Patent
Rooney et al.

Patent Number: 6,070,633
Date of Patent: *Jun. 6, 2000

[54] LOW PRESSURE ALL TERRAIN VEHICLE TIRE

[75] Inventors: Timothy Michael Rooney, Munroe Falls; Thomas Reed Oare, Suffield, both of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/957,014

[22] Filed: Oct. 24, 1997

Related U.S. Application Data

[62] Division of application No. 08/596,908, Mar. 13, 1996, Pat. No. 5,725,701.

[51] Int. Cl.⁷ .................................................... B60C 15/02
[52] U.S. Cl. ......................... 152/540; 152/539; 152/544
[58] Field of Search ................... 152/539, 540, 152/544; 245/1.5; 156/136

[56] References Cited

U.S. PATENT DOCUMENTS

| | | | |
|---|---|---|---|
| 1,981,893 | 11/1934 | Abbott, Jr. | 156/136 |
| 3,840,060 | 10/1974 | Tangorra | 152/353 R |
| 4,059,138 | 11/1977 | Mirtain et al. | 152/330 R |
| 4,177,851 | 12/1979 | Gill et al. | 152/353 R |
| 4,295,509 | 10/1981 | Stein | 152/158 |
| 4,334,565 | 6/1982 | Stokes | 152/158 |
| 4,470,443 | 9/1984 | Eraud | 152/209 R |
| 4,708,186 | 11/1987 | Kopsco et al. | 152/516 |
| 4,820,563 | 4/1989 | Rausch | 152/540 |
| 4,881,586 | 11/1989 | Shinomiya | 152/209 B |
| 4,921,029 | 5/1990 | Palinkas et al. | 152/11 |
| 4,934,425 | 6/1990 | Gajewski et al. | 152/323 |
| 4,940,069 | 7/1990 | Nakaski et al. | 152/544 |
| 4,945,962 | 8/1990 | Pajtas | 152/7 |
| 4,955,417 | 9/1990 | Igarashi | 152/454 |
| 5,042,544 | 8/1991 | Dehasse | 152/302 |
| 5,058,643 | 10/1991 | Nakasaki | 152/209 B |
| 5,078,192 | 1/1992 | Lindsey | 152/155 |
| 5,131,445 | 7/1992 | Tokieda et al. | 152/517 |
| 5,145,536 | 9/1992 | Noma et al. | 152/209 WT |
| 5,158,627 | 10/1992 | Saneto et al. | 152/510 |
| 5,186,772 | 2/1993 | Nakasaki et al. | 152/516 |
| 5,217,549 | 6/1993 | Johnson | 152/517 |
| 5,223,599 | 6/1993 | Gajewski | 528/59 |
| 5,238,040 | 8/1993 | Ghilardi | 152/517 |
| 5,259,429 | 11/1993 | Harms | 152/209 B |
| 5,263,526 | 11/1993 | Oare et al. | 152/540 |
| 5,265,659 | 11/1993 | Pajtas et al. | 152/329 |
| 5,368,082 | 11/1994 | Oare et al. | 152/517 |
| 5,375,640 | 12/1994 | Harms | 152/209 R |
| 5,427,166 | 6/1995 | Willard, Jr. | 152/454 |
| 5,464,051 | 11/1995 | Beard et al. | 152/540 |

FOREIGN PATENT DOCUMENTS 63-293198  8/1990  Japan.

*Primary Examiner*—Geoffrey L. Knable
*Attorney, Agent, or Firm*—David L King

[57] ABSTRACT

A low pressure all terrain vehicle tire 10 features a strapped bead core 20 which comprises distinct layers 30, 32, 34, 36 of filaments 26 positioned relative to one another. The bead core 20 has a substantially square or rectangular cross-section and a radially inward substantially flat base side 44, a radially outermost side 46, an axially inward first side 48, and an axially outward second side 50. The first side 48 intersects the base side 44 at a first edge 54 and forms thereby an included angle α. The second side 50 intersects the base side 44 at a second edge 56 and forms thereby an included angle β. Angle α is equal to β. The bead core 20 has perimeter 42 comprising the lengths of the base 44, radially outermost 46, first 48, and second 50 sides. The perimeter 42 defines the bead core area. The width of the bead heel surface 60 is approximately equal to the distance between a hump 80 and an axially inward surface 74 of the wheel flange 76. The bead core base side 44 has a width in the range of 65% to 90% of the rim seat width W and a radially inner diameter about equal to the diameter of the rim hump 80. The bead heal surface 60 has a width in the range of 80% to 125% the rim seat width W.

8 Claims, 3 Drawing Sheets

LOW PRESSURE ALL TERRAIN VEHICLE TIRE

This a division, of application Ser. No. 08/596,908 filed Mar. 13, 1996, now U.S. Pat. No. 5,725,701.

BACKGROUND OF THE INVENTION

The present invention relates generally to ATV tires, and more specifically to pneumatic tires designed to remain affixed to and in operative association with the vehicle wheel even upon deflation of the tire. Some varieties of these tires include devices designed to support the vehicle when the tire loses inflation pressure. Such tires are commonly known as "run flat" tires.

DESCRIPTION OF THE PRIOR ART

One basic problem with pneumatic tires is that the performance of the tires depends on the retention of pressurized air within the tire. Upon a condition where the pressurized air in the tire escapes, such as when the tire is punctured, performance of the tire can diminish rapidly. In most cases, the vehicle can only be driven a very short distance before the it becomes inoperable.

Because of this deficiency, tire designers have long sought to develop a tire able to provide good driving characteristics and performance even upon deflation of the tire.

One of the key problems in providing such continued performance upon deflation is that of retaining the tire to the wheel. Since the tire is normally retained on the wheel by the pressurized air within the tire pushing the beads and sidewalls of the tire outwardly against a wheel flange, the escape of the pressurized air through puncture or other road hazard eliminates the inner pressure. Absent this pressure, the tire tends to become disconnected and disassociated from the wheel and control of the vehicle becomes more difficult.

Previous efforts to address this deficiency have required a special wheel/tire combination. For various reasons this solution has not proven to be acceptable. One of the chief reasons for the ineffectiveness of the solution is the high cost of the special wheels which were required. These tire/wheel combinations can typically cost several times the cost of the typical tire and wheel combination. Other tire/wheel combinations required special mounting procedures and/or equipment. As such, they have never been commercially acceptable.

There was perceived a need for a new low pressure all terrain vehicle tire which could stay connected to a conventional wheel, even in a deflated condition, without the requirement of a special wheel. In other words, an ATV tire which could be mounted to any conventional wheel, but which would be retained upon the wheel upon tire deflation and would continue to provide acceptable driving performance for an acceptable distance.

Efforts by others to address this need in ATV tires are disclosed in U.S. Pat. Nos. 4,940,069 and 5,186,772.

In addition, several other attempts relating to automobile tires have sought to develop a bead configuration having certain advantageous properties and configurations. For example, in U.S. Pat. No. 4,203,481 a run flat tire is disclosed which is to be used in association with a special rim. In U.S. Pat. No. 1,914,040, a tire bead is disclosed having a rectangular configuration. Further, in U.S. Pat. No. 1,665,070, a tire bead is disclosed having a triangular configuration.

In commonly-owned copending application entitled "A RUN-FLAT LOW-PRESSURE ALL TERRAIN VEHICLE (ATV) TIRE"; Ser. No. 08/616,360, (Attorney Docket No. DN1996-031) which is incorporated here by reference, an innovative ATV run-flat tire utilizing the herein disclosed inventive bead core is disclosed.

SUMMARY OF THE INVENTION

The present invention relates to a pneumatic tire 10 which can be used on a conventional wheel 22 and which will be retained on the wheel 22 even upon deflation of the tire 10. The inventive tire 10 is a vulcanized radial or bias ply pneumatic tire having a pair of axially spaced beads. At least one ply 15 extends between the beads and is turned radially outwardly around the beads. The tire has a toroidal shape. Each of the beads has a bead core 20 which comprises distinct coils of round wire filaments which are arranged in layers 30,32,34,36, in the toroidally-shaped tire prior to its vulcanization, has a polygonal cross-sectional area defined by imaginary lines segments contacting the outer surfaces of the outer filaments 26 in the bead core 20. The bead core 20 is further characterized by the polygonal cross-sectional area having a radially-inward base side 44, a radially outward side 46, a first side 48 and a second side 50. The first and second sides 48,50 extend between the base side 44 and the radially outermost side 46. The first side 48 intersects the base side 44 at a first edge 54 to form an included acute angle α. The second side 50 intersects the base 44 at a second edge 56 to form an included acute angle β, with α being equal to β.

According to another aspect of the invention, the inventive tire 10 can be used in connection with a wheel 22 having a flange 76 and a hump 80. A bead heel surface 60 on the tire 10 can be configured to have a length between 80% and 125% of the distance W between the hump 80 and an axially inward surface 74 of the flange 76, contributing to the tire 10 remaining on the wheel 22 during a deflated condition. Wire filaments 26 in a first layer 30 of the bead core 30 can be configured so that a relatively wide, stiff first layer 30 of filaments 26 can be constructed, further contributing to the retention of the tire 10 on the wheel 20 upon a deflated tire condition.

BRIEF DESCRIPTION OF THE DRAWINGS

Other aspects of the invention will become apparent from the following descriptions when read in conjunction with the accompanying drawings wherein.

DEFINITIONS

Figure 1:
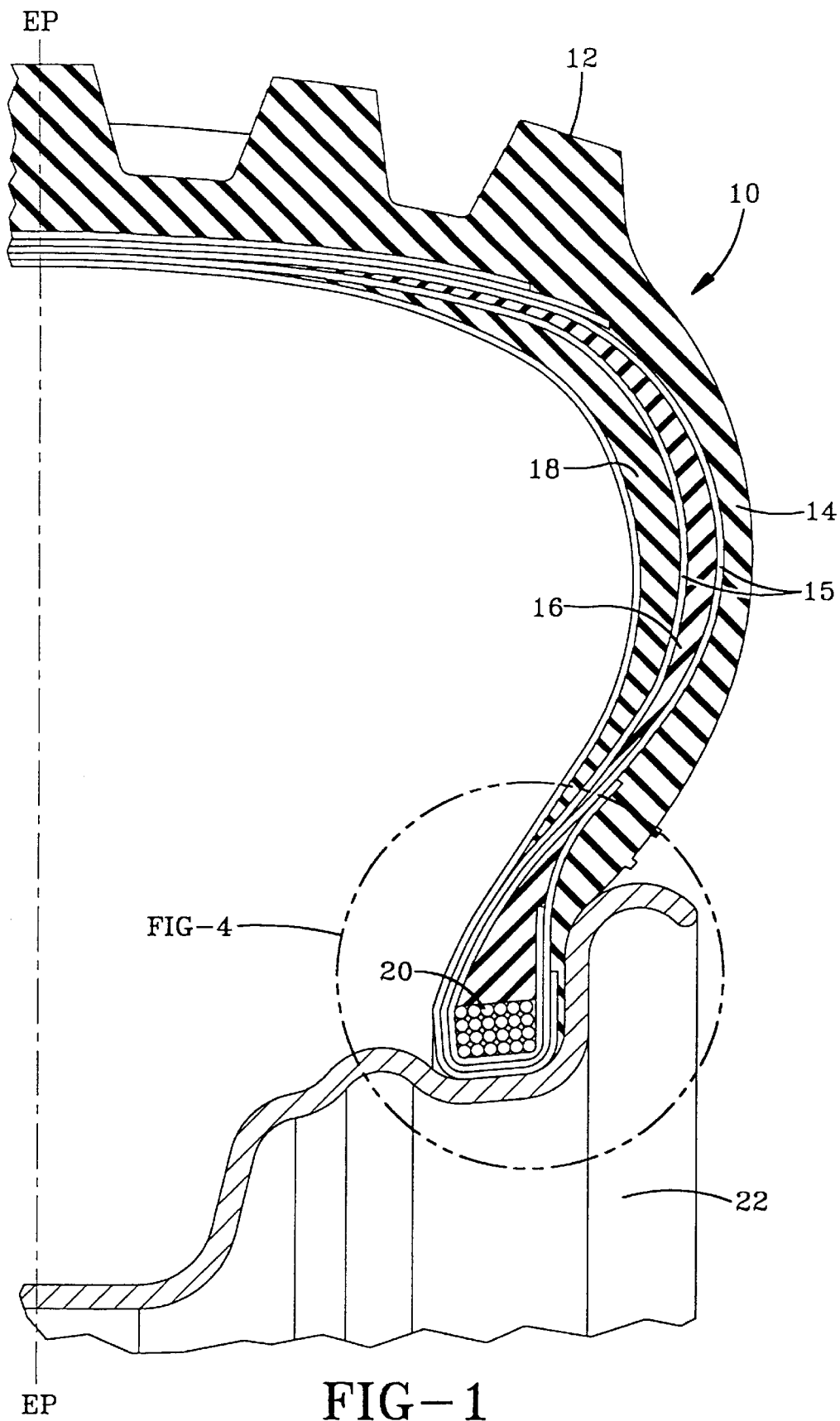
FIG. 1 is a cross-sectional view of one half of a tire according to the invention, the tire being cut along its equatorial plane.

Invention also may be better understood in the context of the following definitions, which are applicable to both the specification and to the appended claims:

"All Terrain Vehicle (ATV)" is any motorized off-highway vehicle 50 inches (1270 mm) or less in overall width, with an unladen dry weight of 600 lbs (275 kg) or less, designed to travel on four low pressure tires, having a seat designed to be straddled by the operator and handlebars for steering control, and intended for use by a single operator and no passenger. Width and weight shall be exclusive of accessories and optional equipment. ATV's are subdivided into four categories as follows:

Category G (General Use Model) ATV: An ATV intended for general recreational and utility use;

Category S (Sport Model) ATV: An ATV intended for recreational use by experienced operators only;

Category U (Utility Model) ATV: An ATV intended primarily for utility use.

Category Y (Youth Model) ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect ratio" of the tire means the ratio of its section height to its section width.

"Axial" and "axially" are used herein to refer to the lines or directions that are parallel to the axis of rotation of the tire.

"Belt or Breaker Structure" means at least two layers or plies of parallel cords, woven or unwoven, underlying the tread, unanchored to the bead and having both left and right cord angles in the range from 17 degrees to 27 degrees with respect to the equatorial plane of the tire for radial ply tires and within 3° of the angle of the bias ply cords in a bias tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means the tire structure apart from the belt structure, tread, under tread, and side wall rubber over the sides, but including the bead.

"Equatorial plane (EP)" means the plane perpendicular to the tire's axis of rotation and passing through the center of its tread.

"Inner" means toward the inside of the tire.

"Outer" means toward the tire's exterior.

"Pneumatic tire" means a laminated mechanical device of generally toroidal shape (usually an opentorus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Radial-Ply tire" means a belted or circumferentially-restricted pneumatic tire in which the ply cords which extend from bead to bead are laid at cord angles between 65 degrees and 90 degrees with respect to the equatorial plane of the tire.

"Section Height" means the radial distance from the nominal rim diameter to the maximum outer diameter of the tire at the road contact surface nearest its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decorations, or protective bands.

"Sidewall" means that portion of the tire between the tread and the bead.

"Tread" means a molded rubber component which when, bonded to a tire casing, includes that portion of the tire that comes into contact with the road when the tire is normally inflated and under normal load.

"Tread Width" means the arc length of the tread surface in the axial direction, that is, the plane passing through the axis of rotation of the tire.

DETAILED DESCRIPTION OF THE INVENTION

Figure 4:
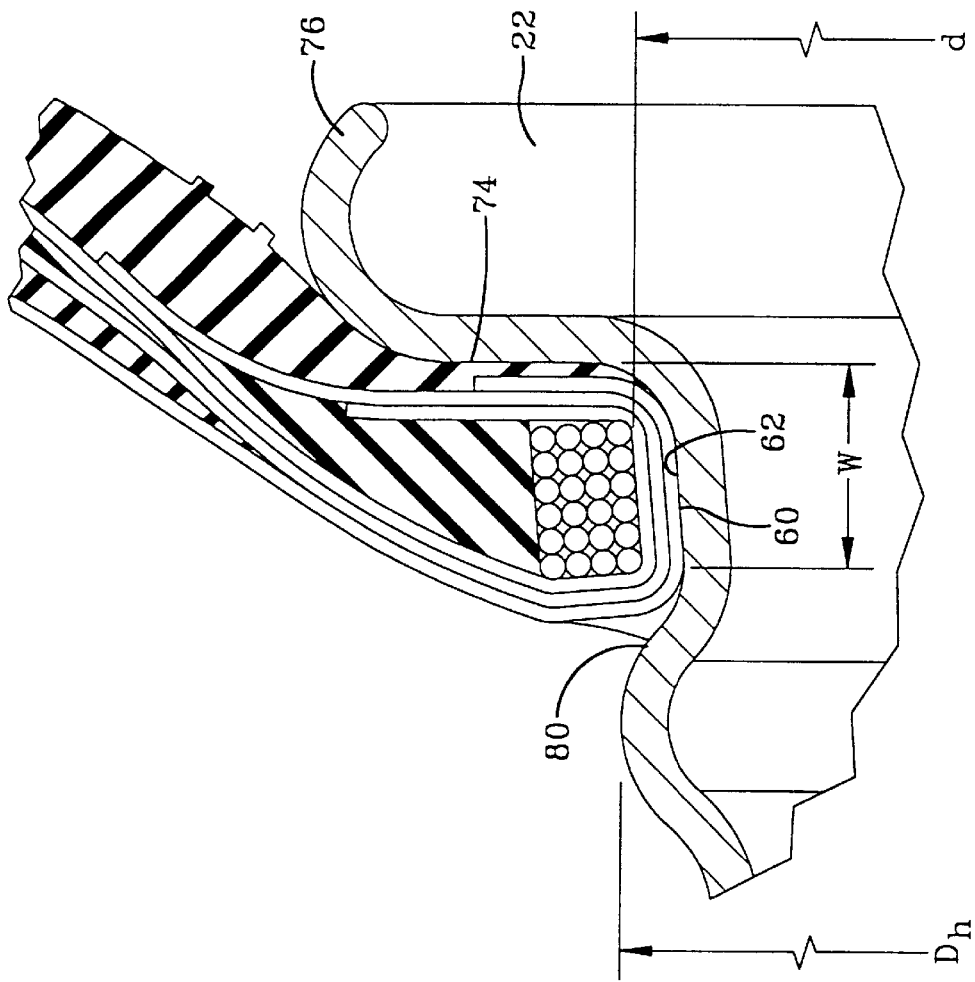
Figure 5:
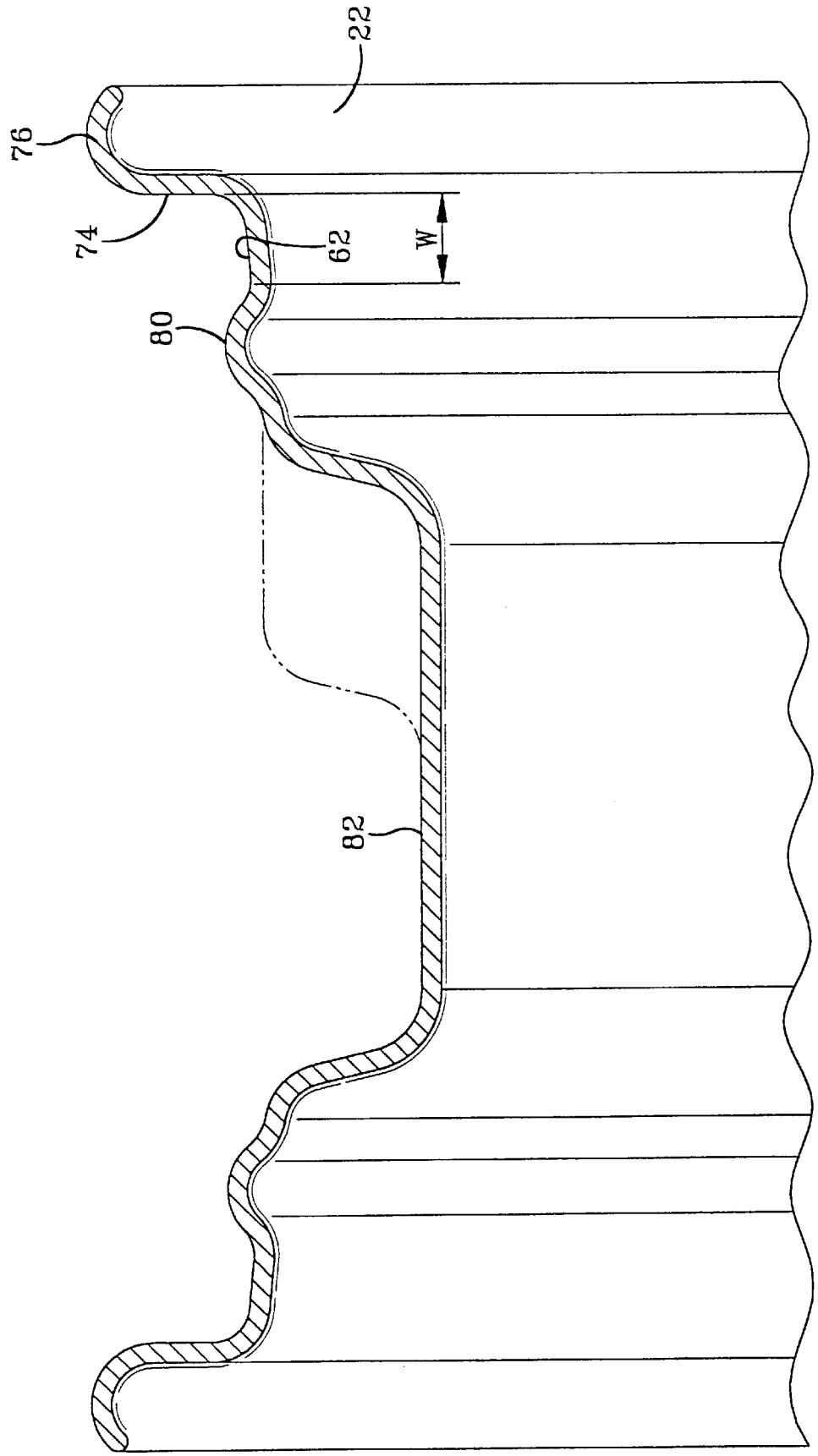
FIG. 5 is a cross-sectional view of the design rim.

In the drawings the same numbers are used for the same components or items in the several views. With particular reference now to FIG. 1, there is illustrated a pneumatic tire 10. The preferred embodiment of the invention has been successfully incorporated into all terrain vehicle tires of sizes AT23x7-10, 22x8.00-10NHS and 22x11.00-10NHS although it is believed the invention is applicable to all types and sizes of ATV tires. The pneumatic tire 10 comprises a tread 12, a pair of sidewalls 14, a carcass 16, and a pair of annular tensile members, commonly referred to as bead cores 20. In the preferred embodiment, the tire 10 includes one or more runflat devices 18 in the sidewalls of the tire 10. It is believed that a tire incorporating the hereafter disclosed invention will remain in operative association with the vehicle wheel and rim whether or not a runflat device 18 is present in the tire. For ease of illustration, only one half of the tire 10 is shown, with the tire being split along its equatorial plane EP. With reference to FIGS. 4 and 5, the tire 10 fits onto and works in conjunction with an associated design wheel or rim 22, which will be discussed later in this disclosure.

Figure 2:
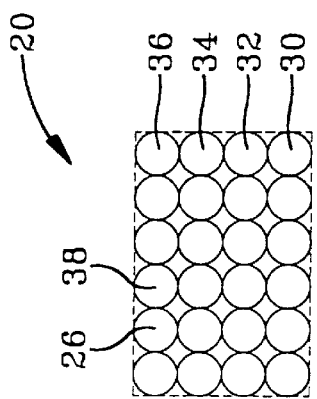
FIG. 2 is a cross-sectional view of a bead core according to the invention.
Figure 3:
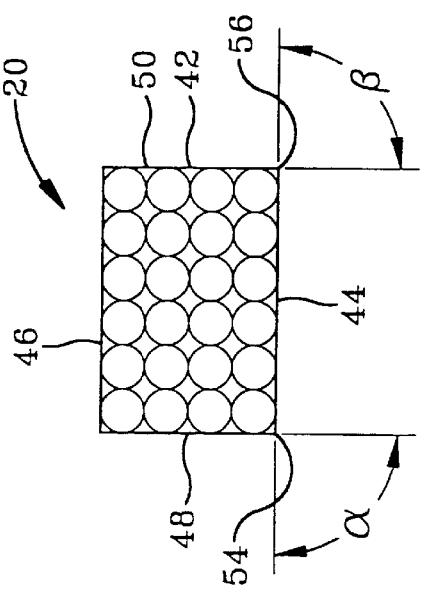
FIG. 3 is a schematic view of the cross-sectional bead core of FIG. 2 with line segments drawn to show the perimeter, angles, and geographical characteristics of the bead core of FIG. 2; and, FIG. 4 is an enlarged cross-sectional view of a portion of FIG. 1 showing the bead core and bead area of the tire as it fits onto an associated wheel rim.

With reference to FIG. 2, a preferred arrangement of bead core filaments is shown. The bead core 20 is shown in cross-section in FIG. 2 and comprises a series of distinct wire filaments 26 arranged in layers. The bead core 20 is preferably comprised of layers, each layer having a continuous filament which is repeatedly annularly wound into an annulus. In other words, each of the filaments 26 shown in cross-section in FIG. 2 are a part of the same continuous filament wound into a distinct layer of the bead core 20. Although a single continuous filament is a feasible embodiment of the invention, it is believed the invention can be most preferably successfully practiced in the case of separate, discrete filaments wound into a annular configuration, such configuration is known as "strap beads."

In the preferred embodiment, each layer of the bead core has the filaments comprised of a single strand of 0.038" diameter wire which is individually coated with 0.004" of elastomeric material. Therefore, the preferred embodiment filament 26 has an overall diameter of 0.046".

In the preferred embodiment, the bead core 20 comprises four layers 30,32,34,36 of filaments 26. The first layer 30 is the most radially inward layer and comprises four to six filaments 26.

The second layer 32, third layer 34 and fourth layer 36 are radially outward of the first layer 30 and comprises the same number of winds of filaments 26. It is important that the filaments of adjoining layers, 30, 32, be bound together.

The bead core 20 has a perimeter 42. The perimeter 42 comprises the lengths of imaginary line segments contacting and tangent to outer surfaces of a base side 44, a radially outermost side 46, a first side 48, and a second side 50.

The base side 44 is the radially innermost side of the bead core 20 and is approximately parallel to the tire's axis of rotation as well as the mating surface of the wheel 22. In the preferred embodiment, the first side 48 is axially inward of the second side 50, although the relative orientation of the first and second sides 48,50 is not believed to be critical for the successful practice of the invention.

The first side 48 extends between the base side 44 and the radially outermost side 46 and intersects the base side 44 at a first edge 54. The first side 48 intersects the base side 44 to form an included acute angle α.

The second side 50 extends between the base side 44 and radially outermost side 46 and intersects the base side 44 at a second edge 56, forming thereby an included acute angle β. In the preferred embodiment, angle α is equal to β.

The perimeter 42 of the bead core 20 defines a cross-sectional area of the bead core. The area of the inventive bead core 20 is the area of a square or rectangle.

In the preferred embodiment, the length of the base side of the bead core 20 is between greater than 0.25" and less than 0.342". In the preferred embodiment, the length of the base side 44 of the bead core 20 is 0.30".

With reference to FIG. 4, the tire 10 has a bead area which includes a bead heel surface 60. The bead heel surface 60 cooperates with the associated wheel 22. An important aspect of the invention is that the wheel 22 is the conventional, design ATV rim as specified for the tire by industry standards, such as the *Tire and Rim Association Yearbook*, which is incorporated herein by reference. For example, the wheel used with the preferred embodiment of the tire in the sizes referred to earlier is a drop center, 5 degree "AT" rim as specified in the *Tire and Rim Association Yearbook*.

With reference to FIG. 5, the wheel 22 comprises an axially inner surface 74 of the wheel flange 76. The wheel 22 also comprises a drop center 82 and a safety hump 80 which lies axially inwardly of the wheel flange 76. The distance between beginning of the safety hump 80 contour and the axially inward surface 74 of the wheel flange 76 is referred to herein as the rim seat 62 and has a width equal to a distance W. The distance W is a standard for the various wheels designed for various vehicles. This information has been standardized in the industry and is obtainable from the *Tire and Rim Association Yearbook*. In the design wheels to be used with the preferred embodiment of the inventive tire, W was equal to 0.400.

With continuing reference to FIG. 4, the tire 10 has a bead area which includes a bead heel surface 60. The bead heel surface 60 cooperates with and is the point of interface with the wheel 22. In the preferred embodiment of the invention, the width of the bead heel surface 60, measured in the axial direction, is substantially equal to the distance W between the hump 80 and the axially inner surface 74 of the wheel flange 76. This area of the wheel 22 will be herein referred to as the rim seat 62. The width of the bead heels of prior art tires were significantly smaller than the inventive bead heel 60. The configuration of the bead core 20, along with the increased width of the bead heel surface 60, causes the tire 10 to remain in operative association with the wheel 22, even in situations where such operative association is uncommon, such as deflation of the tire 10.

Through testing of various designs, the applicant has learned that one the key elements of the tire/wheel design which keeps the tire 10 affixed to the wheel 22 in cases of tire deflation is the design of the base side 44 of the bead core 20 and the bead heel surface 60.

Another one of the key elements of the design is the relationship of the width of the bead core and the width of the bead heel surface 60 to the distance W of the design rim between the hump 80 and the axially inward surface 74 of the vertical flange portion of the wheel rim 22. Prior art designs allowed for significant variation in these two dimensions of the tire bead, allowing for some slippage of the bead heel surface 60 of the tire 10 relative to the rim seat 62 of the wheel 22. For example, the width of the bead core and of the bead heel of one prior art conventional pneumatic ATV tire design was 0.200 inches and 0.350 inches respectively. The bead heel 60 of the preferred inventive tire has a width of 0.500 inches and the bead core 20 base has a width of 0.300 inches. The area of the wheel 22 between the axially inward surface 74 of the wheel 22 and the hump 80 is referred to herein as the rim seat 62. Since the width of the rim seat 62 (the distance W) is 0.400", the preferred tire 10 has a bead heel width equal to 125% of the distance W. It is believed that the width of the bead heel 60 must be between 80% and 125% of the distance W for the tire 10 to remain on the wheel 22 upon tire deflation. By slightly overfilling, or nearly filling, the width of the rim seat 62 with the bead heel 60, the axially inwardmost portion of the bead heel 60 can be positioned partially over the hump 80, around the circumference of the bead heel 60.

Another important element of the successful inventive tire 10 is the width of the first layer 30 of the bead core 20. The inventors believe the widest prior art bead core designs used first layers 30 of widths of 0.25", maximum while the width of the first layer 30 of the inventive bead core 20 is 0.30". Since the width of the rim seat (i.e. "W") is 0.40", the width of the first layer 30 is 75% of W. It is believed that the width of the first layer 30 of the bead core 20 must be between greater than 65% and less than 90% of the distance W. In other words, greater than 0.25 inches and less than 0.36 inches.

Another important aspect of the bead core 20 is the linearity of the first layer 30. By configuring the filaments 26 of the first layer 30 so that their axial centerlines lie in a common plane, the compressive force between the first layer 30 and the rim seat 62 is more uniform than was possible in prior art designs. The more uniform stress between the first layer 30 and the rim seat 62, tends to secure the bead heel 60 to the rim seat 62.

Another important aspect of the inventive design is the dimensional integrity of the bead core 20. Analysis of cut cured tire sections indicate that first layer 30 of the bead core 20 retains its linearity throughout the vulcanization process. Prior art bead cores 20 often deform when the carcass 16 "turns up" during the tire building and vulcanization process. The first layer of filaments 26 in the inventive bead core 20 have an inside diameter smaller than is typical in relevant prior designs. An important element to the dimensional stability is the fact that the inside diameter (d) of the bead core base layer 44 is set about equal to the diameter $D_h$ of the bead hump 80 of the associated rim, as compared with the prior art beads, which had the inside diameter substantially larger than the diameter of the bead hump. The inventors have discovered that the base layer diameter (d) can be in the range of less than 0.020 of an inch greater than the bead hump diameter $D_h$ to 0.030 inches less than the bead hump diameter and the bead can still be mounted onto these relatively small diameter ATV rims. For example, on a 10.0 inch nominal AT rim the bead hump diameter $D_h$ is 10.03 inches and the optimal bead core diameter (d) is 10.03 inches. The preferred tires 10 have the bead cores diameter (d) equal to the diameter $D_h$ of the bead hump 80 regardless of rim size. When the diameter (d) gets much larger, it is possible to have the bead core 20 work its way over the rim 22. It is believed the combination of a very wide bead core and a diameter approximating the rim hump 80 diameter $D_h$ is very important to retaining the tire on the rim when operated uninflated. The smaller diameter combined with the wider bead core base increases the compression of rubber between the bead core 20 and the rim seat 62 which increases the retentive force keeping the tire on the rim. In practice, the first layer 30 is configured to be approximately parallel to the tire's axis of rotation and/or the rim seat 62. In the preferred tire and wheel, the assembly has a 5 degree, drop center "AT" rim, as per the 1995 *Tire and Rim Association Yearbook*, and a tire having the first layer 30 being inclined in the range of parallel to the rim axis to parallel to the rim seat 62, which in turn makes an angle of 5 degrees with the tire's axis of rotation.

The inventive tire 10 mounts onto a typical drop center rim 22 as any conventional prior art tire would. No special wheels or rims are required, nor are any special mounting procedures.

It is also believed that the innovative tire 10 disclosed herein will be retained on the wheel 22 with nearly any effective design of a runflat device 18. Although the runflat devices 18 disclosed are effective and are preferred, the bead design disclosed herein should work with other runflat devices.

What is claimed is:

1. A vulcanized low pressure ATV pneumatic tire having a pair of axially spaced beads, each of the beads having a bead core, the tire having a toroidal shape adapted to be mounted onto a design rim specified for the tire, the design rim being a 5° drop center AT rim as specified in the *Tire and Rim Association Yearbook*, the design rim has a wheel flange and a bead hump, the bead hump has a diameter $D_h$, between the axially inner surface of the wheel flange and the bead hump is a bead seat having a width W, the tire being characterized by each bead having a bead heel surface having a width of between 80% and 125% of W and each bead core having a first layer having a width of greater than 65% and less than 90% of W; wherein when the tire is mounted on the design rim the first layer is a base layer, the base layer having a diameter d, d being in the range of 0.020 of an inch greater than the bead hump diameter $D_h$ to 0.030 of an inch less than the bead hump diameter $D_h$.

2. The vulcanized low pressure ATV pneumatic tire of claim 1 further characterized by at least one ply extending between the beads and turned radially outwardly around the bead cores.

3. The vulcanized low pressure ATV pneumatic tire of claim 1 further characterized by a tread and a pair of sidewalls.

4. The vulcanized low pressure ATV pneumatic tire of claim 3 further characterized by a runflat device in each sidewall.

5. The vulcanized low pressure ATV pneumatic tire of claim 1 further characterized by the bead core having second, third, and fourth layers of filaments.

6. The vulcanized low pressure ATV pneumatic tire of claim 5 wherein the bead core is a strap type bead.

7. The vulcanized low pressure ATV pneumatic tire of claim 5 wherein the bead core is a continuous filament.

8. The vulcanized low pressure ATV pneumatic tire of claim 5 wherein the bead core is a square or rectangular cross-section.

* * * * *